United States Patent
Gupta et al.

(10) Patent No.: US 10,574,547 B2
(45) Date of Patent: Feb. 25, 2020

(54) ANOMALY DETECTION AND CORRECTION IN WIRELESS NETWORKS

(71) Applicant: Cisco Technology, Inc., San Jose, CA (US)

(72) Inventors: Manoj Gupta, Santa Clara, CA (US); Juei Cheng Lo, Los Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 23 days.

(21) Appl. No.: 15/952,114

(22) Filed: Apr. 12, 2018

(65) Prior Publication Data
US 2019/0319863 A1  Oct. 17, 2019

(51) Int. Cl.
| | |
|---|---|
| *H04W 88/08* | (2009.01) |
| *H04L 12/26* | (2006.01) |
| *H04L 12/707* | (2013.01) |
| *H04L 29/08* | (2006.01) |

(52) U.S. Cl.
CPC ............ *H04L 43/028* (2013.01); *H04L 43/04* (2013.01); *H04L 45/22* (2013.01); *H04L 67/12* (2013.01); *H04W 88/08* (2013.01)

(58) Field of Classification Search
CPC .......................... H04W 72/0446; H04W 76/27; H04L 43/028; H04L 43/04; H04L 45/22; H04L 27/20
See application file for complete search history.

(56) References Cited

U.S. PATENT DOCUMENTS

| | | | |
|---|---|---|---|
| 2006/0050806 A1* | 3/2006 | Li ................... | H04B 1/0003 375/295 |
| 2013/0170435 A1* | 7/2013 | Dinan ................ | H04L 45/50 370/328 |
| 2019/0149365 A1* | 5/2019 | Chatterjee ......... | H04L 25/0226 370/329 |

* cited by examiner

*Primary Examiner* — Wei Zhao
(74) *Attorney, Agent, or Firm* — Merchant & Gould P.C.

(57) ABSTRACT

A plurality of digital data packets may be received via a wireless data interface, wired data interface, or data path. Code may be executed for a data communications protocol in which one or more of the filtered digital data packets causes the code to transition to different states of the protocol. A protocol state machine may be executed comprising a plurality of states and a plurality of transitions between the states to simulate correct execution of a particular data communication protocol. An anomaly may be detected between a first particular state of the protocol during the execution of the code and a second particular state of the protocol state machine, and in response, an anomaly event may be generated comprising digital data indicating that the anomaly has occurred. An anomaly event log based on the anomaly event and the filtered digital data packets may be transmitted to a computing device.

18 Claims, 4 Drawing Sheets

ANOMALY DETECTION AND CORRECTION IN WIRELESS NETWORKS

TECHNICAL FIELD

The technical field of the present disclosure relates to improved methods, systems, computer software, and/or computer hardware in the field of network communication. The disclosure relates more specifically to improved computer-implemented methods and systems for applying in-line monitoring to Internet of Things (IoT) devices in order to correlate anomaly events and correct errors in a wireless system while improving the use of network bandwidth and processing efficiency.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Debugging a wireless system is difficult and costly. Debugging a wireless system is difficult due to the high complexity of the radio spectrum and variability in the implementation of wireless networking protocols by client devices. Every few years new protocol standards may be developed and released, making the existing debug infrastructure inadequate because it cannot detect anomalies that are introduced in software that is developed in response to updated standards.

Additionally, debugging a wireless system is costly because traditional debugging techniques may be implemented manually by technicians with minimal software support. Costs associated with manual debugging techniques can be unpredictable and lead to workflow disruptions and increased business costs.

Traditionally, information collection in wireless systems such as packet captures, data logs, and event collections are enabled at all times in the wireless system, or debug information is collected by manually configuring wireless sniffers and enabling logs and packet traces after a bug or anomaly is identified.

These traditional methods for debugging a wireless system are inefficient and error prone. For example, if the system is enabled to collect debug information at all times, valuable computing resources are spent collecting, processing, and sending large amounts of data that will never be utilized. Alternatively, if the system is enabled to collect data such as logs and packet traces after a bug or anomaly is identified, the underlying data relating to the anomaly is not recorded and the anomaly must occur again in order to record the data required to properly troubleshoot the problem. Thus, the existing debugging mechanisms are time consuming, resource expensive, and generally require problem reproduction.

Therefore, there is a need for improved debugging techniques in wireless systems that reduce the use of computing resources, network bandwidth, and overall time and cost of debugging a wireless system.

SUMMARY

The appended claims may serve as a summary of the invention.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein in sections according to the following outline:

1.0 GENERAL OVERVIEW
2.0 STRUCTURAL OVERVIEW
3.0 PROCEDURAL OVERVIEW
4.0 HARDWARE OVERVIEW

1.0 General Overview

According to various embodiments, methods and systems are provided that enable improved computer processing and network efficiency to facilitate in line monitoring and debugging techniques in a networked computing system. Previous approaches used inefficient data collection techniques such as manually configuring wireless sniffers, enabling logs and packet traces after a bug or anomaly is identified, and transmitting all data that is received at an edge node to a central entity whether or not the data is relevant to an anomaly event.

However, the present approach uses data filtering techniques to pinpoint the pieces of data that are useful for troubleshooting and debugging anomalies that occur in the system and reduce the total amount of data that is stored and transferred to a central entity by filtering out data that is not useful. By transferring only filtered packets when an anomaly is identified, a significant drop in the use of network bandwidth is achieved. Additionally, techniques described herein allow for saving only filtered data packets for a threshold amount of time and then deleting them when it is determined that the saved filtered data packets are not associated with any detected anomaly, which further eliminates the need for edge storage space and processing functions such as packet copy and forwarding calls. The capability to link an anomaly event with a finite amount of raw information such as a previous packet capture makes it more efficient to debug a running system and provide useful information a system engineer attempting to troubleshoot the anomaly than previous, inefficient approaches.

In an embodiment, a computer implemented method comprises receiving, at an edge node in a data communications network, a plurality of digital data packets that have been received via a wireless data interface, wired data interface or data path; filtering, by the edge node, the plurality of digital data packets to produce filtered digital data packets; in the edge node, executing code for a data communications protocol in which one or more of the filtered digital data packets causes the code to transition to different states of the protocol; in the edge node, in parallel with executing the code, executing a protocol state machine comprising a plurality of states and a plurality of transitions between the states to simulate correct execution of a particular data communication protocol; detecting, by the edge node, an anomaly between a first particular state of the protocol during the execution of the code and a second particular state of the protocol state machine, and in response, generating an anomaly event comprising digital data indicating that an anomaly event has occurred; in response to detecting the anomaly event, transmitting, by the edge node, an anomaly event log based on the anomaly event and the filtered digital data packets to a different computing device.

In an embodiment, filtering the plurality of digital data packets includes filtering out all digital data packets from the plurality of digital data packets that are not IEEE 802.11 management frame packets or IEEE 802.3 control frame packets.

In an embodiment, the computer implemented method further comprises: generating, using the edge node, a digital accounting record comprising: digital data packet header data from the filtered plurality of digital data packets and physical layer data from the edge node. In an embodiment, the digital packet header data includes a frame control field, a duration field, one or more address fields, a sequence control field, and a QoS control field. In an embodiment, the physical layer data includes a transmit status data rate, fragment information, and reassembly information.

In an embodiment, the computer implemented method further comprises: storing, in a digital data repository, the filtered digital data packets, wherein storing the filtered data packets in the digital data repository includes storing the filtered data packets for a specified amount of time and deleting the filtered data packets when the specified amount of time expires.

In an embodiment, the anomaly event log comprises digital data that indicates the occurrence of the anomaly event.

In an embodiment, in response to detecting the anomaly event, collecting, at the edge node, digital client feedback data, the digital client feedback data comprising digital data associated with the anomaly event; transmitting, by the edge node, the digital client feedback data to a different computing device;

In an embodiment, a packet switch that is communicatively coupled to one or more wireless networking access points and comprising: one or more processors; one or more networking interfaces coupled to the one or more processors; one or more non-transitory computer-readable storage media coupled to the one or more processors and storing one or more sequences of instructions which, when executed using the one or more processors, cause performing: receiving a plurality of digital data packets that have been received via a wireless data interface, wired data interface or data path; filtering the plurality of digital data packets to produce filtered digital data packets; executing code for a data communications protocol in which one or more of the filtered digital data packets causes the code to transition to different states of the protocol; in parallel with executing the code, executing a protocol state machine comprising a plurality of states and a plurality of transitions between the states to simulate correct execution of a particular data communication protocol; detecting an anomaly between a first particular state of the protocol during the execution of the code and a second particular state of the protocol state machine, and in response, generating an anomaly event comprising digital data indicating that an anomaly event has occurred; in response to detecting the anomaly event, transmitting an anomaly event log based on the anomaly event and the filtered digital data packets to a different computing device.

2.0 Structural Overview

Figure 1:
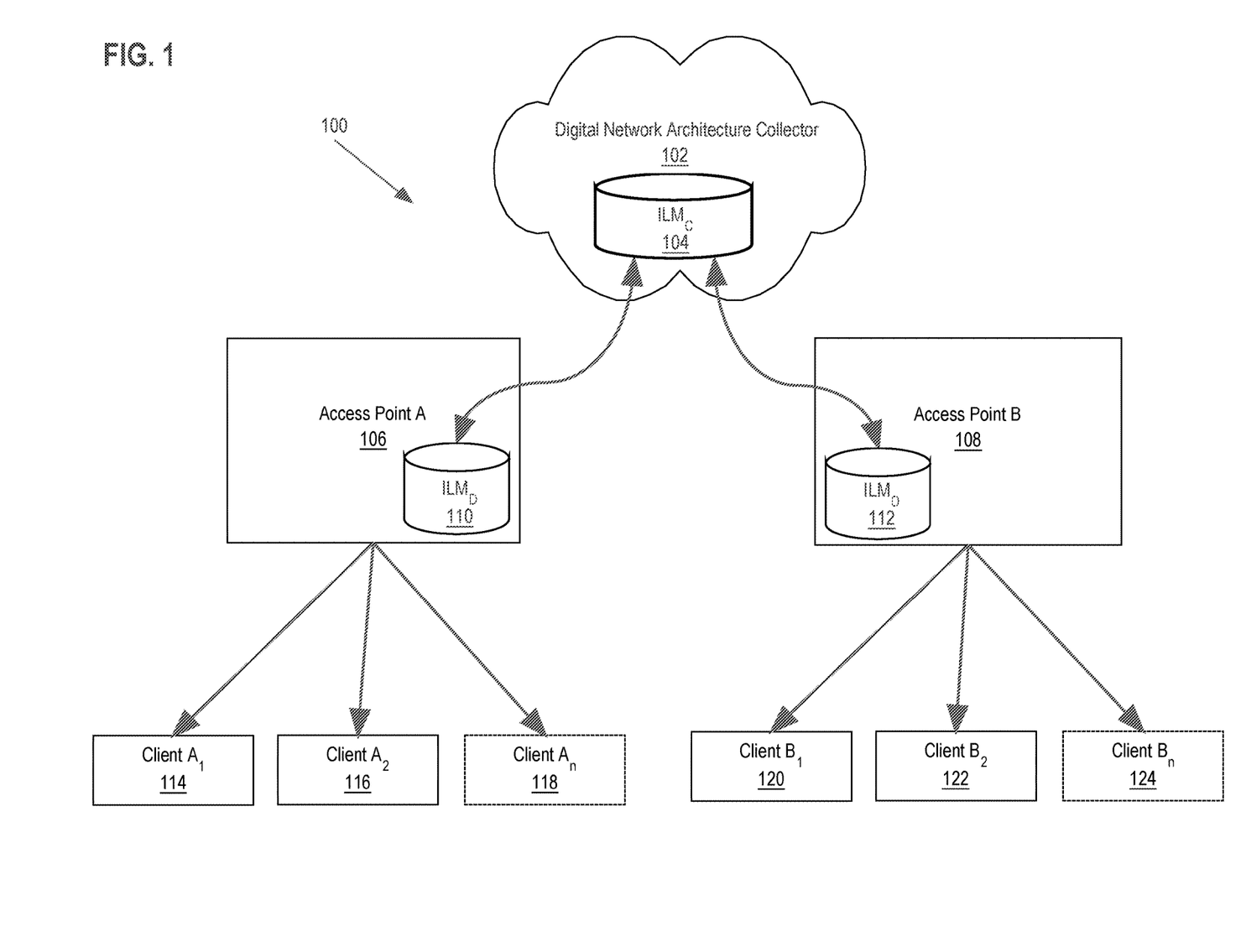
FIG. 1 depicts a networked computer system, in an example embodiment.

FIG. 1 depicts a networked computer system, in an example embodiment.

In an embodiment, the computer system 100 comprises components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments. A "computer" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, computer network devices such as gateways, modems, routers, access points, switches, hubs, firewalls, and/or any other special-purpose computing devices. Any reference to "a computer" herein may mean one or more computers, unless expressly stated otherwise. The instructions identified above are executable instructions and may comprise one or more executable files or programs that have been compiled or otherwise built based upon source code prepared in JAVA, C++, OBJECTIVE-C or any other suitable programming environment.

In the example of FIG. 1, a networked computer system 100 may facilitate the secure exchange of data between programmed computing devices. Therefore, each of elements 102, 106, 108, 114, 116, 118, 120, 122, 124 of FIG. 1 may represent one or more computers that are configured to provide the functions and operations that are described further herein in connection with network communication. FIG. 1 depicts only one of many possible arrangements of components configured to execute the programming described herein. Other arrangements may include fewer or different components, and the division of work between the components may vary depending on the arrangement. For example, any number of access points or other network devices may be used to facilitate communication between any number of endpoint client devices and a central entity.

Digital Network Architecture Collector ("DNA-C") 102 broadly represents a central entity such as a server computer system and may be implemented using a server-class computer or other computers having one or more processor cores, co-processors, or other computers. DNA-C 102 may be a physical server computer and/or a virtual server instance stored in a data center, such as through cloud computing. An In Line Monitoring (ILM) element in DNA-C, ILMc 104, comprises various computing elements and instructions for implementing aspects of the flow diagrams that are further described herein. DNA-C 102 is programmed or configured to receive, process, and send data to and from each access point through a network (not illustrated in FIG. 1). DNA-C 102, in coordination with ILMc 104 is further programmed or configured to store historical data relating to client interactions with access points, send policies via the network to client devices, dynamically enable various logs, statistics, and packet collection on each access point, and display anomalies with associated information. ILMc 104 may be implemented as a plugin, a library, a driver, or some other set of programming instructions.

Network (not illustrated in FIG. 1) may broadly represents any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1.

Access points A and B 106, 108 each broadly represent a computer that includes hardware capable of and connecting to a central entity through a network. Access points, also referred to as "edge node devices", 106, 108 may be any edge network device, such as routers or switches. Edge node device 106, 108 may be an internetwork computing device configured to receive, process, and send data to and from each client device and central entity. Each access point 106, 108 may include an ILM Daemon ("$ILM_D$" 110, 112). ILM Daemon 110, 112 comprises various computing elements and instructions for implementing aspects of the flow diagrams that are further described herein.

Client computing device 114, 116, 118, 120, 122, 124 is a computer that includes hardware capable of communicatively coupling client computing device 114, 116, 118, 120, 122, 124 to one or more access points. For example, client computing device 114, 116, 118, 120, 122, 124 may include a network card that communicates with an access point such as a home or office wireless router. Client computing device 114, 116, 118, 120, 122, 124 may be a server-class computer, smart phone, personal computer, tablet computing device, PDAs, laptop, or any other computing device capable of transmitting and receiving information and performing the functions described herein.

Figure 2:
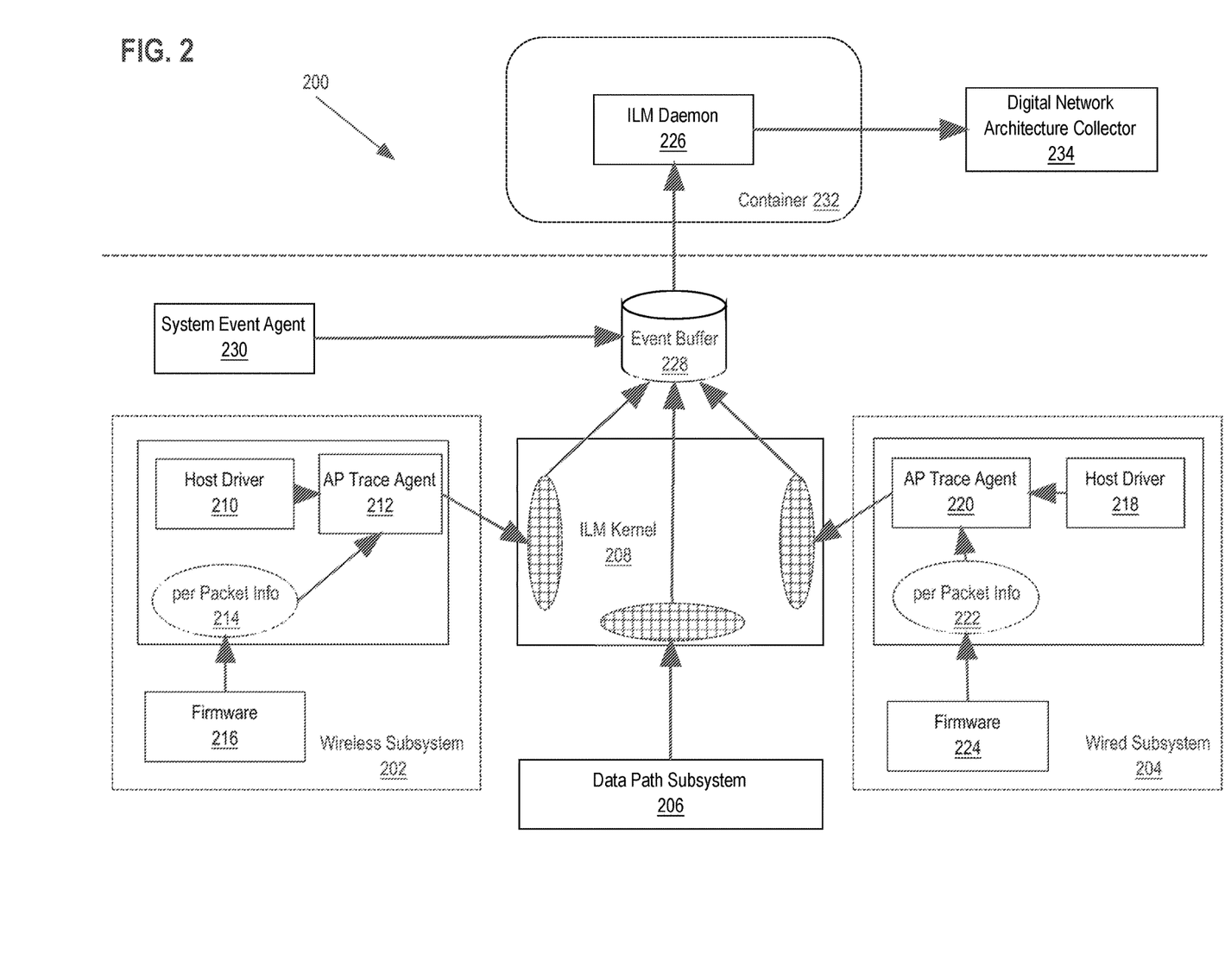
FIG. 2 depicts an In Line Monitoring (ILM) agent running on an access point, in an example embodiment.

FIG. 2 depicts an In Line Monitoring ("ILM") agent running on an access point. For example, FIG. 2 may illustrate an ILM agent executing on Access Point A 106 or Access Point B 114 from FIG. 1, in an example embodiment. The ILM agent comprises various computing elements and instructions for implementing aspects of the flow diagrams that are further described herein.

Computer executable instructions described herein may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 2 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by the access point.

The ILM agent comprises multiple subsystems such as the wireless subsystem 202, wired subsystem 204 and data path subsystem 206. Each subsystem provides per packet information to the ILM kernel 208. The wireless subsystem 202 includes a host driver 210, firmware 216, and AP trace agent 212. The firmware 216 is responsible of receiving 802.11 format packets from an external source, such as a radio chipset. On the receiving path, the firmware 216 executes cyclic redundancy checks (CRCs), decrypts aggregated packets, generates per-packet information, de-aggregates packets and sends them to the host driver 210. On the transmitting path, the firmware 216 receives packets from data path subsystem 206, aggregates received data packets, and schedules received data packets based on client traffic priorities. Additionally, the firmware 216 populates the received 802.11 format packets with header information for each packet, encrypts it, and generates the per-packet information 214 after sending packets outside the wireless subsystem 202. In an embodiment, digital packet header data includes a frame control field, a duration field, one or more address fields, a sequence control field, and a QoS control field.

Per packet info 214 includes per-packet information for transmitting packets across subsystems and also includes radio details such as transmit status (e.g. success/failure/retried), data rate, aggregation used, and air time consumed for transmitting. For received data packets, per packet info 214 includes details such as radio channel designation, signal strength, detected noise floor, and aggregation used for transmission by client.

The host driver 210 is programmed or configured to receive requests(s) and execute various system functionalities such as state machine processing, serviceability, logging, configuration of the firmware, as well as data receiving and forwarding. The host driver 210 may receive per packet information 214 and perform logging and analysis on the per packet information 214. The host driver 210 may be implemented as a plugin, a library, a driver, or some other set of programming instructions.

AP trace agent 212 is designed to monitor, analyze events, and correlate events. AP trace agent 212 may also generate statistics for detecting and correcting problems identified in each subsystem. AP trace agent 212 may include a kernel module which implements the framework for interaction with each of the wireless, data path, and wired subsystems 202, 206, 204. For example, the AP trace agent 212 may be implemented as a plugin, a library, a driver, or some other set of programming instructions.

AP trace agent 212 provides functionalities such as packet logging and filtering based on protocol type, client MAC address, packet drop analysis which can reveal the modules that are dropping packets, memory monitoring, subsystem memory leak monitoring, subsystem queue length monitoring, statistics collection, and packet captures.

The wired subsystem 204 handles the receiving and transmitting of packets over Ethernet interface. The wired subsystem 204 includes a host driver 218, firmware 224, and AP trace agent 220. The firmware 224 is responsible of receiving 802.3 format packets from a wired source. On the receiving path, the firmware 224 executes cyclic redundancy checks (CRCs), decrypts aggregated packets, generates per-packet information, de-aggregates packets and sends them to the host driver 218. On the transmitting path, the firmware 224 receives packets from data path subsystem 206, fragments received data packets, and schedules received data packets based on client traffic priorities. Additionally, the firmware 224 populates the received 802.3 format packets with header information for each packet, encrypts it, and generates the per-packet information 222 after sending packets outside the wired subsystem 204.

Per packet info 222 includes per-packet information for transmitting packets across subsystems and also includes physical layer details such as transmit status (e.g. success/failure/retried), data rate, fragment information for transmitting, and reassembly information for transmitting. For received data packets, per packet info 222 includes details such as fragment/reassembly information.

The host driver 218 is programmed or configured to receive requests(s) and execute various system functionalities such as state machine processing, serviceability, logging, configuration of the firmware, as well as data receiving and forwarding. The host driver 218 may receive per packet information 222 and perform logging and analysis on the per packet information 222. The host driver 218 may be implemented as a plugin, a library, a driver, or some other set of programming instructions.

AP trace agent 220 is designed to monitor, analyze events, and correlate events. AP trace agent 220 may also generate statistics for detecting and correcting problems identified in each subsystem. AP trace agent 220 may include a kernel module which implements the framework for interaction with each of the wireless, data path, and wired subsystems 202, 206, 204. For example, the AP trace agent 220 may be implemented as a plugin, a library, a driver, or some other set of programming instructions.

AP trace agent 220 provides functionalities such as packet logging and filtering based on protocol type, client MAC address, packet drop analysis which can reveal the modules that are dropping packets, memory monitoring, subsystem memory leak monitoring and subsystem queue length monitoring, statistics collection, and packet captures.

The data path subsystem 206 includes modules that provides firewall services, network address translation ("NAT"), policy enforcement based on deep packet inspections, flow classification, protocol handling services Each subsystem provides per packet information to the ILM kernel 208. The ILM kernel 208 receives data packets from each subsystem 202, 206, 204 and filters each data packet to identify if a packet is a candidate for being processed next. The ILM kernel 208 applies filters to each data packet to get the essential per-packet information in order to generate events. Events are passed on to ILM daemon 226 via a shared memory mechanism, such as the Event Buffer 228, to reduce system overhead. The event buffer 228 may also receive system generated events, such as resource utilization, from the system event agent 230.

Outputs of the ILM kernel 208 include logs that indicate when a particular type of packet was last observed. Logs may be sent to [0025] digital network architecture collector ("DNA-C") 234 for debugging, correlation, analysis and visualization.

The ILM daemon 226 executes in the container 232, which may be CGroups, LXC or Docker based but is not limited to any technology. The purpose of running the ILM daemon 226 in a container 232 is to decouple it from AP base image to support in-field upgradability, improve stability and limit the resource usage by ILM daemon.

The ILM daemon 226 implements computing logic or instructions to detect event anomalies using per-packet information generated by the multiple subsystems 202, 204, 206 and to generate event logs, which are then sent to a central entity such as DNA-C 234. On detection of event anomalies, the ILM daemon 226 can optionally generate a trigger for the ILM kernel 208 module to send additional information (e.g. raw packets, current configuration, syslog etc.) to the DNA-C 234 central entity in order to correlate an event.

In-Line Monitoring (ILM) daemon 226 provides functionalities such as anomaly detection, configuration validation, and learning/adaptation, Anomaly Detection provides the capability to detect problems specific to a client based on IEEE 802.11 or IEEE 802.3 protocol validation. This is accomplished by generating a client state machine from the information provided by host driver and comparing the client state machine to a state machine simulation that simulates a state machine based on expected client behavior. In this context, state machines are used to identify the state of the protocol execution flow. The state machine stores the state of the protocol execution, indicating the current state which a client is in along with transitions between states, referred to as events. Transitions between states in the state machine are caused by the occurrence of events.

Configuration validation provides the capability of validating the wireless configuration with the packets being transmitted by the AP. It then feeds into the anomaly detection to produce intelligent information correlating configuration change to problem seen.

Learning and adaptation allows ILM to learn client information and use it for future client connection to utilize the spectrum and capacity. It monitors client activity time, power save behavior, optimal rate, bandwidth requirements etc. and feeds the information to a rate algorithm, band steering and load balancing decisions.

As an example of the packet flow between subsystems 202, 204, 206, on the receiving end, a radio driver detects wireless energy and preamble to decode 802.11 packets. These packets are DMA to the chip memory. The firmware then investigates this memory, performs validations, generates the per-packet information, and executes another DMA to the host memory for the host driver to process it. The host driver processes the packets for management handling and data forwarding. Management packets are used for maintaining client state machines on the AP. Data packets are forwarded to the intended destinations through the data path subsystem 206 followed by the wired subsystem 204. Per-packet information is forwarded to host driver then injected into AP trace agent for further logging and analysis.

On the transmitting side, packets can be received from external sources or internally generated. The packets that are received from external sources first come in from the wired subsystem 204, follow by data path subsystem 206, then to the wireless subsystem 202. Internally generated packets can be received from the data path subsystem 206 for containment and the wireless subsystem 202 for management. After firmware transmits a data packet out of a subsystem, per-packet information is generated and forwarded to a host driver and AP trace agent, the same as the receiving end.

3.0 Procedural Overview

Figure 3:
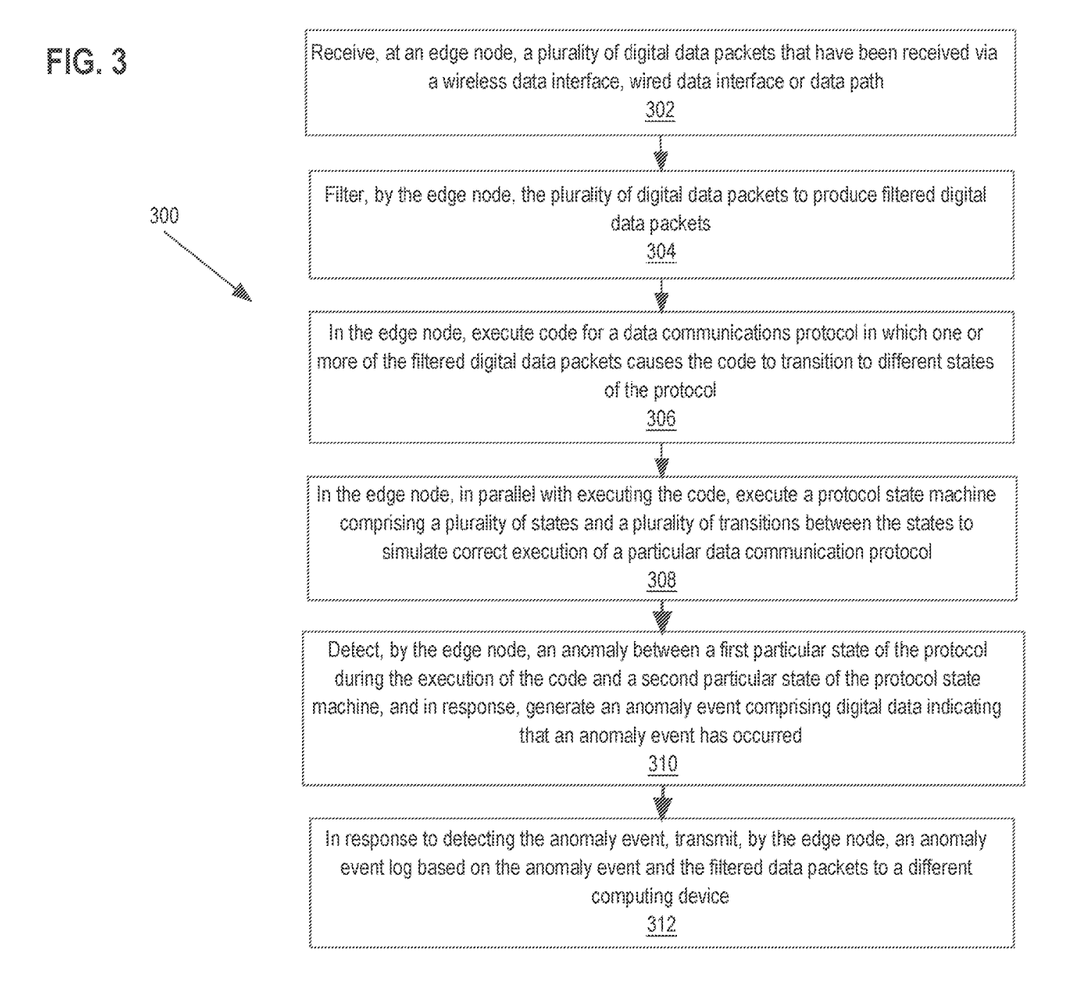
FIG. 3 depicts a method or algorithm for detecting anomalies at edge computing devices, in an example embodiment.

FIG. 3 depicts a method or algorithm for anomaly detection and correction using in line monitoring, in an example embodiment. FIG. 3 is described at the same level of detail that is ordinarily used, by persons of skill in the art to which this disclosure pertains, to communicate among themselves about algorithms, plans, or specifications for other programs in the same technical field. While the algorithm or method of FIG. 3 shows a plurality of steps for anomaly detection and correction using in line monitoring, the algorithm or method described herein may be performed using any combination of one or more steps of FIG. 3 in any order, unless otherwise specified.

In an embodiment, the method or algorithm 300 begins with step 302.

At step 302, a plurality of digital data packets that have been received via a wireless data interface, wired data interface or data path are received at an edge node in a data communications network. For example, as discussed above with respect to FIG. 2, digital data packets may be received via wireless subsystem 202, wired subsystem 204, or data path subsystem 206 which may exist inside an access point 106, 108 or edge node as shown in FIG. 1.

At step 304, the plurality of digital data packets is filtered at the edge node to produce filtered digital data packets. For example, as discussed above with respect to FIG. 2, for data packets received at the wireless subsystem 202 of an edge node 106, 108, the firmware 216 generates per packet information 214. The host driver 210 processes the per packet information 214 for management handling and data forwarding. The host driver 210 forwards the per-packet information 214 to AP trace agent 212 for further logging and analysis. AP trace agent 212 will perform logging, filtering, and analysis operations before passing the per packet information 214 to the ILM kernel 208. The ILM kernel 208 receives per packet information 214 from each subsystem 202, 204, 206 and applies filters to each data packet to get the essential per-packet information in order to generate events.

In an embodiment, per packet information includes information for transmitting packets across subsystems, radio details such as transmit status (e.g. success/failure/retried), data rate, aggregation used, and air time consumed for transmitting. For received data packets, per packet info includes details such as radio channel designation, signal strength, detected noise floor, and aggregation used for transmitting.

In an embodiment, filtering the plurality of digital data packets includes filtering out all digital data packets from the plurality of digital data packets that are not IEEE 802.11 management frame packets or IEEE 802.3 control frame packets.

In an embodiment, the filtered digital data packets are stored in memory for a threshold amount of time and deleted when the specified amount of time expires. For example, due to edge node storage constraints, storing each and every digital data packet in memory and permanent storage is impracticable. Storing filtered digital data packets for a threshold amount of time, e.g. 10 minutes, provides the system with a timeframe to check for anomaly events, as described herein by flow 300 of FIG. 3. If an anomaly is detected, the stored packets may be retrieved from memory and transmitted with an event log to a different computing device. If an anomaly is not detected, the stored packets are deleted from memory. By only storing data packets for a threshold amount of time, this technique allows the system to dynamically enable debug infrastructure for efficient resource utilization because the stored packets are only useful for debugging purposes if an anomaly event is detected within a certain time frame. If an anomaly event is not detected within a threshold amount of time, it can be assumed that no anomaly events were detected based on the stored packets, and thus, the stored packets have no immediate utility for debugging operations.

At step 306, in the edge node, code is executed for a data communications protocol in which one or more of the filtered digital data packets causes the code to transition to different states of the protocol. For example, the ILM daemon 226 from FIG. 2 will receive the filtered data packets and execute code for a data communications protocol based on the filtered data packets. The code may comprise a protocol state machine. Data packets may include information corresponding to events, which may cause transition to different states of the protocol.

At step 308, in the edge node, a protocol state machine is executed, in parallel with executing the code, comprising a plurality of states and a plurality of transitions between the states to simulate correct execution of a particular data communication protocol. For example, the ILM daemon 226 from FIG. 2 executes a protocol state machine in parallel with the code from step 306. The protocol state machine simulates the expected behavior of a particular communication protocol such as IEEE 802.11 or IEEE 802.3.

At step 310, an anomaly between a first particular state of the protocol during the execution of the code and a second particular state of the protocol state machine is detected by the edge node, and in response, an anomaly event is generated comprising digital data indicating that an anomaly event has occurred. For example, the ILM daemon 226 from FIG. 2 executes code for a data communications protocol defined in step 306 in parallel with the protocol state machine from step 308. Because the protocol state machine simulates the expected behavior of the transitioning of states based on events, if the code for a data communications protocol enters a state that does not match the state of the protocol state machine, an anomaly is detected, and an anomaly event is generated.

For example, if a client is in power save mode, the protocol state machine will simulate the behavior of a client that is in power save mode. In this circumstance, the state machine will expect no transitions between states, as the power save mode does not cause any state transitions. If a digital data packet received from the client in power save mode causes the code for a data communications protocol to transition to a different state, the state of the protocol state machine and state of the data communications protocol are identified as inconsistent, and an anomaly is detected by the edge node.

In another example, in an application where data packets are expected to be received from a client in a sequence order, a received data packet that is out of sequence order may cause the protocol state machine to transition to a state that is inconsistent with the state of the state of the code for the data communications protocol executing in step 306. In response, an anomaly is detected by the edge node because the state of the protocol state machine is inconsistent with the state of the code for the data communications protocol.

Additionally, in an embodiment, anomalies can be detected based on system behavior and not based on data packets received from clients. For example, events may be generated by the system and received from the system event agent 230. The system event agent 230 may generate events based on system activity, for example, such as reporting system utilization every 60 seconds. A state machine, such as the state machine discussed in step 308, can be used to simulate the correct execution of a particular data communication protocol. If the system event agent generates an event that causes the code for the data communications protocol to transition to a state that is inconsistent with the state of the protocol state machine, an anomaly is detected. In the case of a system resource utilization event, if the system event agent generates an event indicating a resource utilization that is above or below a threshold that is expected by the protocol state machine, an anomaly is detected by the edge node.

At step 312, in response to detecting the anomaly event, transmitting, by the edge node, an anomaly event log based on the anomaly event and plurality of the filtered digital data packets to a different computing device. For example, when an anomaly event is generated, the ILM daemon 226 from FIG. 2 will generate and transmit an anomaly event log along with the filtered digital data packets to DNA-C 234 or any computing device that is different than the current edge node. On generation of anomaly events, the ILM daemon 226 can optionally generate a trigger for the ILM kernel 208 to send additional information (e.g. raw packets, filtered packets, current configuration, syslog etc.) to a central entity such as DNA-C to assist with correlating the event.

In an embodiment, the anomaly event log comprises digital data that indicates the occurrence of the anomaly event. In another embodiment, the different computing devices comprises a non-edge node computing device.

In an embodiment, the different computing device receives the filtered digital data packets and anomaly event log from the edge node. The filtered digital data packets and anomaly event log may be used by the different computing device to generate actions to remedy the anomaly at the edge node. In response to receiving the filtered digital data packets and anomaly event log, the different computing device may transmit system calls and/or commands to the edge node to resolve the anomaly event. For example, the different computing device may identify, based on the filtered digital data packets and anomaly event log, that a client connected to the edge node has transmitted packets in a pattern that the different computing device identifies as a denial of service attack. In response, the different computing node transmits a system call to the edge node that causes the edge node to blacklist the client responsible for the denial of service attack.

In an embodiment, in response to detecting the anomaly event, collect, at the edge node, digital client feedback data, the digital client feedback data comprising digital data associated with the anomaly event, and transmit, by the edge node, the digital client feedback data to a different computing device. For example, when an anomaly event is detected, the edge node may redirect all client web browser traffic associated with the anomaly event to a specific URL or website where the clients are prompted to provide feedback regarding connection experience quality. This feedback is used to decide the level of debugging that needs to be enabled on the edge node. Clients may be provided an option to opt out of the feedback survey and continue with normal operation of the edge node.

Using the foregoing techniques, a programmed edge computing device such as an access point is locally responsible to detect event anomalies for clients. By allowing edge devices to detect event anomalies, far less data is required to be transferred to a central entity such as a cloud server for anomaly detection and processing. In prior approaches, either all the data related to an anomaly event was reported over a network to a cloud server for anomaly detection and processing or no data was recorded at all until after the anomaly was detected. In an Internet of Things context where thousands of devices may be connected to a single access point, transferring and processing an immense amount of data to resolve a single anomaly event with one client is impracticable.

By detecting anomalies on the edge node and by transferring only filtered packets when an anomaly is detected, a significant drop in the use of network bandwidth is achieved. Additionally, techniques described herein allow for only saving filtered data packets for a threshold amount of time, which further eliminates the need for edge storage space and processing functions such as I/O system calls. The capability to link an anomaly event with raw information such as a previous packet capture makes it more efficient to debug a running system and provide useful information a system engineer attempting to troubleshoot the anomaly than previous approaches.

4.0 Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 4:
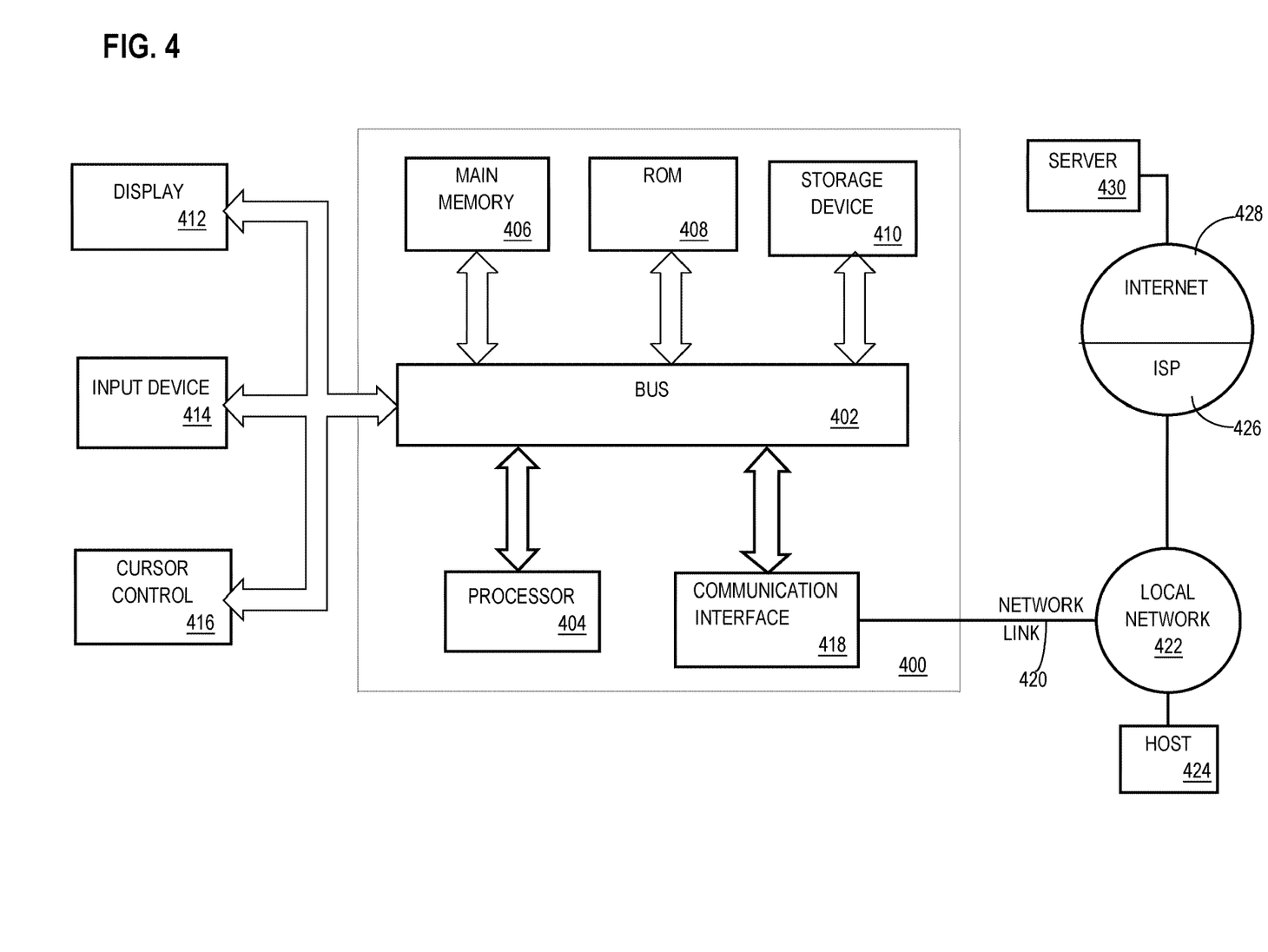
FIG. 4 depicts a computer system upon which an embodiment of the invention may be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM, and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on display 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A method comprising:
   receiving, at an edge node in a data communications network, a plurality of digital data packets that have been received via a wireless data interface, wired data interface or data path;
   filtering, by the edge node, the plurality of digital data packets to produce filtered digital data packets;
   in the edge node, executing code for a data communications protocol in which one or more of the filtered digital data packets causes the code to transition to different states of the protocol;
   in the edge node, in parallel with executing the code, executing a protocol state machine comprising a plurality of states and a plurality of transitions between the states to simulate correct execution of a particular data communication protocol;
   detecting, by the edge node, an anomaly between a first particular state of the protocol during the execution of the code and a second particular state of the protocol state machine, and in response, generating an anomaly event comprising digital data indicating that the anomaly has occurred;
   in response to detecting the anomaly, transmitting, by the edge node, an anomaly event log based on the anomaly event and the filtered digital data packets to a computing device different from the edge node;
   wherein the method is performed by one or more processors of the edge node.

2. The method of claim 1, wherein the edge node comprises a wireless networking access point (AP).

3. The method of claim 1, wherein filtering the plurality of digital data packets includes filtering out all digital data packets from the plurality of digital data packets that are not IEEE 802.11 management frame packets or IEEE 802.3 control frame packets.

4. The method of claim 1, further comprising:
   generating, using the edge node, a digital accounting record comprising: digital data packet header data from the filtered plurality of digital data packets and physical layer data from the edge node.

5. The method of claim 4, wherein the digital packet header data includes a frame control field, a duration field, one or more address fields, a sequence control field, and a QoS control field.

6. The method of claim 4, wherein the physical layer data includes a transmit status data rate, fragment information, and reassembly information.

7. The method of claim 1, further comprising:
   storing, in a digital data repository, the filtered digital data packets;
   wherein storing the filtered data packets in the digital data repository includes storing the filtered data packets for a specified amount of time and deleting the filtered data packets when the specified amount of time expires.

8. The method of claim 1, wherein the anomaly event log comprises digital data that indicates the occurrence of the anomaly event.

9. The method of claim 1, further comprising:
   in response to detecting the anomaly event, collecting, at the edge node, digital client feedback data, the digital client feedback data comprising digital data associated with the anomaly event;
   transmitting, by the edge node, the digital client feedback data to the computing device.

10. The method of claim 1, wherein the computing device comprises a non-edge node.

11. A packet switch that is communicatively coupled to one or more wireless networking access points and comprising:
   one or more processors;
   one or more networking interfaces coupled to the one or more processors;
   one or more non-transitory computer-readable storage media coupled to the one or more processors and storing one or more sequences of instructions which, when executed using the one or more processors, cause performing:
   receiving a plurality of digital data packets that have been received via a wireless data interface, wired data interface or data path;
   filtering the plurality of digital data packets to produce filtered digital data packets;
   executing code for a data communications protocol in which one or more of the filtered digital data packets causes the code to transition to different states of the protocol;
   in parallel with executing the code, executing a protocol state machine comprising a plurality of states and a plurality of transitions between the states to simulate correct execution of a particular data communication protocol;
   detecting an anomaly between a first particular state of the protocol during the execution of the code and a second particular state of the protocol state machine, and in response, generating an anomaly event comprising digital data indicating that the anomaly has occurred;
   in response to detecting the anomaly, transmitting an anomaly event log based on the anomaly event and the filtered digital data packets to a computing device different from the edge node.

12. The packet switch of claim 11, wherein filtering the plurality of digital data packets includes filtering out all digital data packets from the plurality of digital data packets that are not IEEE 802.11 management frame packets or IEEE 802.3 control frame packets.

13. The packet switch of claim 11, further comprising:
generating, using the edge node, a digital accounting record comprising: digital data packet header data from the filtered plurality of digital data packets and physical layer data from the edge node.

14. The packet switch of claim 13, wherein the digital packet header data includes a frame control field, a duration field, one or more address fields, a sequence control field, and a QoS control field.

15. The packet switch of claim 13, wherein the physical layer data includes a transmit status data rate, fragment information, and reassembly information.

16. The packet switch of claim 11, further comprising:
storing, in a digital data repository, the filtered digital data packets;
wherein storing the filtered data packets in the digital data repository includes storing the filtered data packets for a specified amount of time and deleting the filtered data packets when the specified amount of time expires.

17. The packet switch of claim 11, wherein the anomaly event log comprises digital data that indicates the occurrence of the anomaly event.

18. The packet switch of claim 11, further comprising:
in response to detecting the anomaly event, collecting, at the edge node, digital client feedback data, the digital client feedback data comprising digital data associated with the anomaly event;
transmitting, by the edge node, the digital client feedback data to the computing device.

* * * * *